United States Patent Office 2,917,482
Patented Dec. 15, 1959

2,917,482

ELECTRICAL INSULATION COMPRISING POLYVINYL ACETAL-PHENOL ALDEHYDES CURED WITH OXACIDS OF PHOSPHORUS

Edward Lavin and Andrew F. Fitzhugh, Longmeadow, and Robert N. Crozier, Wilbraham, Mass., assignors to Shawinigan Resins Corporation, Springfield, Mass., a corporation of Massachusetts No Drawing. Application October 12, 1956
Serial No. 615,452

6 Claims. (Cl. 260—43)

This invention relates to polyvinyl acetal wire enamels. More particularly, this invention relates to polyvinyl acetal phenol-aldehyde wire enamels having improved solvent resistance.

The vast majority of magnet wires used in industry today are insulated with polyvinyl acetal phenol-aldehyde wire enamels. The proper degree of cure is essential in these coatings in order to obtain the desired balance of characteristics. For example, an overcured coating is usually brittle while an undercured coating possesses poor resistance to solvents and usually too great a degree of thermoplasticity. Extreme overcuring can also lead to solvent failure.

It has been found that the amount of heat required for the proper degree of cure of these coatings will differ with different phenol-aldehyde resins and will also differ from lot to lot with commercially available phenolic resins. It is especially difficult to obtain a satisfactorily cured wire insulation when the phenol-aldehyde has been stored too long. In some instances, it has been found that the phenolic resin used will yield a satisfactory cure upon exposure to a certain temperature and time but that a slight increase or decrease in exposure to heat will yield an overcured or undercured enamel respectively. It is highly desirable to produce wire enamels with wide curing ranges.

An object of this invention is to produce highly solvent resistant polyvinyl acetal phenol-aldehyde wire enamels. A further object is to obtain wire enamels with a proper degree of cure.

Another object of this invention is to produce wire enamels with wide curing ranges.

These and other objects are attained with wire coating compositions comprising polyvinyl acetals, soluble heat hardenable phenol-aldehyde resins and a minor amount of a substance of the group consisting of phosphoric, hypophosphoric, benzenephosphoric, hypophosphorous, phosphorous acids and alkyl esters and ammonium salts of the phosphorous oxacids.

The addition of these acidic substances to polyvinyl acetal phenol-aldehyde wire enamels not only improves the cure obtained with poor phenolics but also permits the use of stabilized polyvinyl acetals which heretofore could not be cured with phenol aldehyde resins to produce solvent resistant coatings.

This invention is illustrated but not limited by the following examples in which parts are by weight.

EXAMPLE 1

(a) *Preparation of polyvinyl formal*

Two hundred parts of polyvinyl acetate were dissolved in 370 parts of glacial acetic acid in a suitable reaction vessel. To this was added 166 parts formalin (aqueous solution containing 37% formaldehyde) and 13.6 parts concentrated $H_2SO_4$. Hydrolysis and acetalization were carried out simultaneously while agitating at a temperature of about 70° C. The varnish produced was neutralized with 26 parts concentrated $NH_4OH$ at a degree of conversion yielding a polyvinyl formal containing 5–6% hydroxyl groups (calculated as polyvinyl alcohol) and 9.5–13% acetate groups (calculated as polyvinyl acetate). Water was added under rapid agitation to precipitate the resin which was thereupon thoroughly washed, centrifuged and dried.

(b) *Preparation of phenolic resin*

A phenolic resin typical of those used commercially with polyvinyl acetals in wire enamels was prepared. One hundred parts of a mixture of meta and para cresols were refluxed at about 85° C. with 60 parts formalin and 3.2 parts triethanolamine for about 2.5 hours. The reaction product was thereupon dehydrated under vacuum at a temperature of about 80° C. yielding a clear dark viscous resin. The resin obtained was dissolved in an equal weight of commercial cresylic acid (B.P. 207–233° C.).

(c) *Preparation of the blank wire enamel*

One hundred parts of the polyvinyl formal and 100 parts of the phenolic resin solution were mixed together and dissolved in 250 parts of cresylic acid and 450 parts of high solvency coal tar hydrocarbons (B.P. 150–184° C., composed principally of alkyl benzenes, approximately 80% being trimethyl and tetramethyl benzenes). Twelve successive coats of the resulting wire enamel were applied to 16 gauge (U.S. wire gauge) copper wire by conventional means, each coat being cured at temperatures of about 335° C. The curing time was about 25 seconds since the wire was passed through a twelve foot oven with an effective curing zone of about 4 feet at a rate of 10 feet per minute. The build (increase in wire diameter) due to the coating was 5.5 mils.

(d) *Blank enamel with* $H_3PO_4$

Another wire enamel was prepared identical to the above except that 0.2 part of $H_3PO_4$ was added. This was applied to a copper wire in a like manner.

(e) *Testing*

A solvent resistance test was thereupon used to determine whether the wire enamels had been cured sufficiently. Four strands (approximately 30 inches long) of each of the wires were placed in a refluxing mixture of equal volumes of ethyl alcohol and toluene for 10 minutes. The wire coating containing the phosphoric acid (*d*) was uneffected by the solvents whereas the blank coating (*c*) was softened to the extent that it could be pierced with a fingernail and the coating had separated from the wire strands at several points.

The flexibility of both the blank (*c*) and the $H_3PO_4$ (*d*) containing wire coatings was tested by elongating the wires 25% and then wrapping the wire around itself ten times. No crazing, cracking or peeling was evidenced by either type.

(f) *Wire enamel containing unneutralized polyvinyl formal*

Another wire was insulated in a similar manner with a wire enamel identical to the blank except that the polyvinyl formal used had not been neutralized with $NH_4OH$ but was merely washed continuously with water. The coating produced was also resistant to the alcohol-toluene mixture but was extremely overcured and cracked and peeled from the wire when tested by the method described even when the wire was wrapped around a diameter three times as thick as the wire.

(g) *Variations in curing time*

Results identical to those obtained under (*c*), (*d*) and (*f*) were obtained by decreasing the exposure to heat, that is, by curing at wire speeds of 11 ft./min. for approximately a 22 second exposure. Similar coatings were also obtained by curing at 9 ft./min. for an exposure of about 27 seconds except that the coating produced under (c) showed a slight improvement in solvent resistance when compared to the coating cured at 10 ft./min.

One of the problems in the use of wires insulated with polyvinyl acetal-phenol aldehyde enamels is heat stability. It is well known in the art that polyvinyl acetals of greater stability may be produced by steeping the precipitated resin in a fixed base, e.g., KOH, NaOH, etc., after the resin was neutralized in the varnish stage as in Example 1(a). It is also known that increased stability may be obtained by incorporating various organic bases including amines such as triethanolamine, ethylene diamine, diethylenetriamine, etc. However, these stabilized polyvinyl acetals have not been usable heretofore for insulative wire coatings containing phenolic resins because they could not be cured satisfactorily and therefore possessed excessive thermoplastic flow and were readily attacked by solvents. Polyvinyl acetals produced with hydrochloric acid catalysts have generally been more stable resins and have also failed to produce properly cured wire coatings.

EXAMPLES 2–23

The following examples illustrate the effectiveness of traces of various acids on the cure of wire enamels containing various types of polyvinyl acetal and phenol-aldehyde resins. Wire enamels were prepared in the same proportions as those in Example 1(c) and similarly coated on wire, dried and cured.

Polyvinyl acetals used—

A is a polyvinyl formal prepared as in Example 1(a) except that hydrochloric acid was used as the catalyst rather than sulfuric acid.

B is a polyvinyl formal prepared as in Example 1(a) except that the precipitated material was washed and then steeped in aqueous KOH under thorough agitation at 50° C. for 3 hours.

C is a polyvinyl formal similar to B except that triethanolamine was used as the stabilizer instead of KOH.

D is a polyvinyl butyral prepared as in Example 1(a) except that butyraldehyde was used instead of formaldehyde.

Phenolic resins used—

E is a commercially available resin for magnet wire enamels similar to the resin prepared in Example 1(b).

F is a different commercially available phenolic resin similar to the resin prepared in Example 1(b).

| Example | Wire speed, ft./min. | Polyvinyl Acetal | Phenolic Resin | Additive [1] | Solvent [2] Resistance |
|---|---|---|---|---|---|
| 2 | 10 | Ex. 1(a) | E | Blank | F |
| 3 | 9 | Ex. 1(a) | E | Blank | F |
| 4 | 10 | Ex. 1(a) | E | 0.2% H$_3$PO$_4$ | P |
| 5 | 10 | A | E | Blank | F |
| 6 | 10 | A | E | 0.2% H$_3$PO$_4$ | P |
| 7 | 10 | B | E | 0.18% HP(OH)$_2$ | P |
| 8 | 10 | B | E | 0.1% HP(OH)$_2$ | P |
| 9 | 10 | B | E | 0.2% H$_3$PO$_4$ | P |
| 10 | 10 | B | F | 0.2% H$_3$PO$_4$ | P |
| 11 | 10 | B | F | 0.1% H$_3$PO$_4$ | P |
| 12 | 10 | B | F | 0.05% H$_3$PO$_4$ | P |
| 13 | 10 | B | F | 0.015% H$_3$PO$_4$ | F |
| 14 | 9 | B | F | 0.025% H$_3$PO$_4$ | P |
| 15 | 9 | B | F | Blank | F |
| 16 | 10 | C | F | Blank | F |
| 17 | 10 | C | F | 0.2% H$_3$PO$_4$ | P |
| 18 | 10 | D | Ex. 1(b) | Blank | F |
| 19 | 10 | D | Ex. 1(b) | 0.15% HP(OH)$_2$ | P |
| 20 | 10 | D | Ex. 1(b) | 0.02% Butyl Acid phosphate. | P |
| 21 | 10 | D | Ex. 1(b) | 0.05% Butyl Acid phosphate. | P |
| 22 | 10 | Ex. 1(a) | Ex. 1(b) | 0.2% Butyl Acid phosphate. | P |
| 23 | 10 | Ex. 1(a) | Ex. 1(b) | 0.05% Butyl Acid phosphate. | P |

[1] The percent additive is based on the weight of polyvinyl acetal.
[2] P indicates the cured wire coating passed the alcohol-toluene solvent resistance test, F indicates failure.

The wire coatings in the examples that passed the solvent resistance test also passed the flexibility test.

These solvent resistant wire enamels all possess the proper balance of characteristics required for commercial insulated magnet wires. Besides possessing solvent resistance and flexibility the coatings have excellent dielectric values, toughness, chemical resistance, adhesion, resistance to thermoplastic flow, and resistance to abrasion.

EXAMPLE 24

A wire coated with 6 coats of the enamel used in Example 12 showed the following properties:

| | |
|---|---|
| Solvent resistance | P |
| Flexibility (diameters) | 1 |
| Jerk test | P |
| Twist (No. of turns) | 67 |
| Build (mils) | 3.2 |
| Abrasion (strokes) | 224 |
| Heat aging at 150° C. (3× life) hrs | 160 |
| Dielectric aging 2 kv. (200° C.) hrs | 165 |

The jerk test (rapid elongation) consists of jerking the coated wire having a length of at least 10 inches exclusive of the length required by the gripping jaws, at a rate of approximately 15 feet per second to the breaking point of the metal. Cracking or visible loss of adherence of the insulation at any point other than that of rupture of the conductor shall constitute failure.

The twist test constitutes clamping the coated wire between jaws 10 inches apart, scraping one side of the wire bare, and twisting axially until the coating loosens.

Abrasion resistance is determined by elongating the coated wire about 1% to remove kinks, thereupon using a NEMA-General Electric Abrasion Tester to scrape the coating with a steel needle 0.016" in diameter under a load of 780 g. and noting the number of strokes required to wear through the coating.

Heat aging (also known as 3×life) consists of aging the coated wire at 150° C. and periodically testing by winding the wire 10 times on a mandrel with a diameter 3 times that of the wire. The testing cycles are chosen to give at least 10 cycles per completed test. Life is the time at which cracking occurs less ½ of the previous cycle.

Dielectric aging is conducted on the insulated wire additionally coated by immersing the wire in an oil-modified phenolic varnish and air drying overnight. The wire is twisted ten times and subjected at intervals to 2,000 volts for one second. One-half the preceding interval is subtracted from the time to breakdown to obtain the 2 kv. life. This is a standard test of the National Electrical Manufacturers Association and is described in their publication MW–15, April 1955.

EXAMPLES 25–27

The use of phosphoric acid in coatings containing a stabilized polyvinyl acetal is compared below to a standard polyvinyl acetal wire enamel to show that the presence of the acids in this invention does not injure the dielectric strength.

| Example | Percent H$_3$PO$_4$ | Polyvinyl Acetal | Phenolic Resin | Dielectric Strength (volts/mil) Dry | Dielectric Strength (volts/mil) Wet |
|---|---|---|---|---|---|
| 25 | 0.2 | B | F | 2,600 | 2,000 |
| 26 | 0.1 | B | F | 2,440 | 1,910 |
| 27 | | Ex.1(a) | F | 2,500 | 2,000 |

The polyvinyl acetals used are prepared by acetalizing polyvinyl esters (such as polyvinyl acetate), partially hydrolyzed polyvinyl esters or fully hydrolyzed polyvinyl esters using methods well known in the art such as those disclosed in U.S. Reissue No. 20,430 to Morrison et al.

These may contain from about 3–25% alcohol groups and from about 1–30% ester groups, calculated respectively by weight as polyvinyl alcohol and polyvinyl ester. Polyvinyl acetals acetalized with formaldehyde, acetaldehyde, propionaldehyde, butyraldehyde and mixtures thereof may be used. Polyvinyl formals are usually preferred where high abrasion resistance is required.

Since polyvinyl acetals are prepared by acid catalysis, the acetals are neutralized with ammonia or other alkalies, such as KOH, to remove residual amounts of acid. Mere washing with water or aqueous mixtures is insufficient. If polyvinyl acetal wire enamels are desired with improved stability towards heat the acetals themselves must be specially treated. This is usually accomplished by steeping the acetals after neutralization and precipitation with fixed bases or organic amines, amides, urea compounds, etc. Extensive work has been reported on such neutralization and stabilization and typical methods are described in U.S. Patent 2,282,057 to Hopkins et al. wherein alkali hydroxides or tertiary amines are used as the stabilizing agent. U.S.P. 2,282,026 to Bren, teaching the use of hexamethylene tetramine, methacrylal urea, di (o-toluyl guanidine), etc. and U.S.P. 2,258,410 to Dahle, teaching the use of triethanolamine are among the many other patents relating to polyvinyl acetals stabilized by being treated with alkaline materials.

The phenol-aldehyde resins used in these compositions are soluble, heat hardenable, resols well known in the art and disclosed in Jackson et al. Patent 2,307,577. They are generally prepared by reacting 1 mol of a phenol with from 0.7 to 2 mols of a lower aldehyde under alkaline conditions. Acetaldehyde, propionaldehyde and butyraldehyde may be used as well as others, but formaldehyde is usually preferred because of its greater reactivity. A variety of phenols may be used including monohydric phenols such as phenol, cresols, xylenols, ethylphenol, p-t-butyl phenol, other alkyl phenols etc. or mixtures thereof.

The acid curing agents used may be phosphoric, hypophosphoric, benzenephosphoric, hypophosphorous, phosphorous and similar acids and ammonium salts and alkyl esters of the phosphorous oxacids. Alkyl esters of these various phosphorous containing acids are often preferred because of their greater solubility. Other acids may well be suitable as long as they are not too readily volatile, however, hydrochloric, oxalic and acetic acids do not improve the cure of the wire enamels. In order to maintain a maximum pot life for the enamels, the acids are preferably incorporated in the wire enamel just prior to use. The acid may be added to the polyvinyl acetal before the resin is included in the wire enamel but the addition of acid to the phenolic resin itself results in a premature cure of the phenolic and renders it non usable in these formulations.

The optimum amount required of the different acids used may be readily determined for the various polyvinyl acetals and phenol aldehyde resins. The concentrations will generally range from 0.02 to 2% based on the weight of polyvinyl acetal. Excess amounts of acid may produce an overcured coating and in addition may tend to adversely affect the insulative properties of the coatings produced. In general it is highly desirable to keep the amount of acids low not only because of the possible adverse effect on the dielectric properties of the enamels but also because excess acid may decrease the stability of the polyvinyl acetal. Wire enamels containing polyvinyl acetals treated by steeping the precipitated resin (after neutralization) in alkaline materials will, in general, require a little more acid to improve the cure of the composition than wire enamels containing polyvinyl acetals which were only neutralized before precipitation. The cure of these wire enamels may also be catalyzed with salts such as sodium or potassium phosphates but the presence of any alkali metal cations is detrimental to the dielectric properties of the coatings formed.

Coatings may be produced from compositions containing, in parts by weight, 100 parts polyvinyl acetal and from 5–100 parts phenolic resin. Larger amounts of phenolic resin tend to form brittle coatings, the use of smaller amounts decreases the solvent and abrasion resistance. Almost any volatile, non-reactive, organic solvents for the enamel components with a satisfactory rate of evaporation during drying and curing may be used. Suitable solvents include cresols, furfural, coal tar naphthas, high-boiling or high-solvency hydrocarbons, other aromatic solvents such as toluol, xylol, etc. The compositions may be cured at temperatures ranging from 250–500° C.

In addition to improved solvent resistance and the use of a greater variety of polyvinyl acetals and a greater variety of phenolic resins, these compositions possess a wider curing range. It is therefore easier to obtain a proper cure with thicker individual coatings and with a greater number of successive coatings than heretofore. In many cases it is also possible to cure the coatings at a more rapid rate. The use of stabilized polyvinyl acetals provides the additional advantage of improved heat aging. The criticality of the age of the phenolic resin used is greatly decreased by the use of these trace acid catalysts in the enamel.

These enamels may be used effectively on a variety of metals and may be used in other coating applications as well as on wires. Various other materials such as fillers, plasticizers, coloring agents, etc. may be incorporated as is conventional in the art. The compositions of this invention may also be used as potting compositions or cast articles such as slot liners may be molded from these compositions.

What is claimed is:

1. A wire enamel comprising, in parts by weight, a volatile organic solvent solution of 100 parts of a polyvinyl acetal first neutralized, then stabilized with an alkali hydroxide, 5–100 parts of phenol aldehyde resin and 0.02–2.0 parts of an acidic substance taken from the group consisting of phosphoric, hypophosphoric, benzenephosphoric, hypophosphorous, phosphorous acids and ammonium salts and alkyl esters of phosphorous oxacids.

2. A wire carrying an electrically insulative coating, said coating being the dried and heat cured composition of claim 1.

3. An electrically insulative composition comprising the composition of claim 1 cured at 250–500° C.

4. A wire enamel comprising, in parts by weight, an organic solvent solution of 100 parts of a polyvinyl formal first neutralized, then stabilized with an alkali hydroxide, 5–100 parts of a soluble, heat hardenable phenol-formaldehyde resin and 0.02–2.0 parts of acidic substance taken from the group consisting of phosphoric, hypophosphoric, benzenephosphoric, hypophosphorous, phosphorous acids and ammonium salts and alkyl esters of phosphorous oxacids.

5. The process of producing a solvent resistant, insulative coating which comprises drying and curing a composition comprising, in parts by weight, an organic solvent solution of 100 parts of a polyvinyl acetal first neutralized, then stabilized with an alkali hydroxide, and 5–100 parts of a phenol-aldehyde resin, having added to the composition 0.02–2.0 parts of an acidic substance taken from the group consisting of phosphoric, hypophosphoric, benzenephosphoric, hypophosphorous, phosphorous acids and ammonium salts and alkyl esters of phosphoric oxacids.

6. The process of claim 5 wherein the polyvinyl acetal is polyvinyl formal, the phenol-aldehyde resin is an alkyl phenol-formaldehyde resin.

(References on following page)

References Cited in the file of this patent

UNITED STATES PATENTS

| | | |
|---|---|---|
| 2,282,026 | Bren et al. | May 5, 1942 |
| 2,302,557 | Langkammerer | Nov. 17, 1942 |
| 2,307,588 | Jackson et al. | Jan. 5, 1943 |
| 2,380,824 | Dahle | July 31, 1945 |
| 2,396,098 | Haas | Mar. 5, 1946 |
| 2,447,983 | Little | Aug. 24, 1948 |

FOREIGN PATENTS

| | | |
|---|---|---|
| 703,333 | Great Britain | Feb. 3, 1954 |